(12) United States Patent
Cornils et al.

(10) Patent No.: US 6,240,676 B1
(45) Date of Patent: Jun. 5, 2001

(54) ADJUSTABLE GLAZING FOR MOTOR VEHICLES

(75) Inventors: Gerd Cornils, Merzenich-Girbelsrath; Jürgen Panitz, Nörvenich, both of (DE)

(73) Assignee: Saint-Gobain Vitrage, Courbevoie (FR)

(*) Notice: Subject to any disclaimer, the term of this patent is extended or adjusted under 35 U.S.C. 154(b) by 0 days.

(21) Appl. No.: 09/319,369

(22) PCT Filed: Sep. 10, 1998

(86) PCT No.: PCT/FR98/01931
§ 371 Date: Aug. 31, 1999
§ 102(e) Date: Aug. 31, 1999

(87) PCT Pub. No.: WO99/17945
PCT Pub. Date: Apr. 15, 1999

(30) Foreign Application Priority Data

Oct. 4, 1997 (DE) .......................................... 297 17 718 U

(51) Int. Cl.[7] .................... E05F 15/12; B60J 1/14; E05D 1/02
(52) U.S. Cl. .................... 49/324; 49/397; 49/402; 16/225
(58) Field of Search .................... 49/324, 495.1, 49/397, 402, 381; 16/225, 385

(56) References Cited

U.S. PATENT DOCUMENTS

| | | | |
|---|---|---|---|
| 1,763,603 | * 6/1930 | Donahue | 296/93 |
| 3,521,403 | * 7/1970 | Bouwkamp | 49/324 |
| 4,281,476 | * 8/1981 | LeVan | 49/34 |
| 4,363,191 | * 12/1982 | Morgan | 49/381 |
| 4,777,699 | * 10/1988 | Hill et al. | 16/225 |
| 5,203,113 | * 4/1993 | Yagi | 49/324 |
| 5,438,801 | * 8/1995 | Ishihara et al. | 49/357 |
| 5,457,913 | * 10/1995 | Gold | 49/381 |
| 5,560,153 | 10/1996 | Gold . | |

FOREIGN PATENT DOCUMENTS

| | | |
|---|---|---|
| 87 09 446 | 8/1987 | (DE) . |
| 39 25 804 | 8/1990 | (DE) . |
| 0 646 483 | 4/1995 | (EP) . |
| 1 215 267 | 12/1970 | (GB) . |

\* cited by examiner

*Primary Examiner*—Daniel P. Stodola
*Assistant Examiner*—Gregory J. Strimbu
(74) *Attorney, Agent, or Firm*—Pennie & Edmonds LLP

(57) ABSTRACT

An orientable glazing for a vehicle having a glazing frame which has an attachment flange (3). The glazing includes a toughened window glass (4), a run of elastically deformable adhesive (18) along a part of the periphery of the window glass (4) for bonding the window glass (4) to the attachment flange (3), a profiled elastomer seal (12) laid against the window glass at least in that part of the periphery of the window glass (4) that is not covered by the run of adhesive (18), and an opening and closing mechanism (24), wherein the run of adhesive is along the front edge (5), along the upper edge, along the contour of the upper rear corner (20) of the window glass (4), and along an upper segment (A) of the rear edge (6) of the window glass (4), and wherein the opening and closing mechanism acts in the region of the lower rear corner (22) of the window glass (4).

8 Claims, 1 Drawing Sheet

ADJUSTABLE GLAZING FOR MOTOR VEHICLES

BACKGROUND OF THE INVENTION

The present invention relates to orientable glazing for motor vehicles, attached to a glazing frame which has an attachment flange, and comprising a toughened window glass, a run of elastically deformable adhesive along part of the periphery of the window glass for bonding the window glass to the attachment flange, a profiled elastomer seal laid against the window glass at least in that part of the periphery of the window glass that is not covered by the run of adhesive, and an opening and closing mechanism acting at a point on the window glass that lies opposite the run of adhesive.

Pivoting orientable glazing of this type is already known from document DE-U-8709446. In this known orientable glazing, the run of adhesive acts as a hinge and is installed along the vertical front edge of the window glass. Along the other edges of the window glass, there is a preformed profiled seal fixed to the edge of the window glass.

Document U.S. Pat. No. 5,560,153 discloses orientable glazing for motor vehicles, in which a run of adhesive laid along the upper horizontal edge of the window glass acts as a hinge, the opening and closing mechanism acting on the middle of the lower edge of the window glass. In this case too, the run of adhesive extends only in a straight line along the middle of the upper edge of the window glass and ends before the rounded corner region which, in the same way as the remaining part of the periphery of the window glass, is sealed by a simple tubular seal which, for its part, is laid on the window frame flange.

Known orientable glazings of this type have specific drawbacks. Specifically, all the known embodiments have in common the fact that when the glazing is in the open position in a motor vehicle travelling in the rain, it does not prevent the rain from coming in. Furthermore, known orientable glazing has the drawback that the window glass, when open, shakes, particularly when the vehicle is travelling at high speed, and thus creates annoying noises.

SUMMARY OF THE INVENTION

The object of the invention is to improve orientable glazing of the type described in the preamble in such a way that when in the open position in a moving vehicle, it is, on the one hand, sufficiently sealed against rain coming in and, on the other hand, does not shake about annoyingly, particularly at high speed.

The orientable glazing according to the invention is characterized in that the run of adhesive is along the vertical front edge, along the upper edge and, following the contour of the upper rear corner of the window glass, along an upper segment of the rear edge of the window glass, and in that the mechanism for opening and closing the orientable glazing acts in the region of the lower rear corner of the window glass.

Unlike the known orientable glazing, in the case of the orientable window glazing according to the invention, the run of adhesive is also laid along part of the periphery of the window glass in which the run of adhesive does not in any way act as a hinge when opening and closing the glazing. On the contrary, when opening the glazing the run is exclusively, or at least for the most part, made to stretch at this point. Not only will the angle through which the window glass is pivoted in this case cause the elastic stretching of this part of the run of adhesive, but also, part of the bending moment exerted on the window glass by the opening mechanism will also, to a certain extent, lead to elastic bending of the window glass, which will further increase the mechanical rigidity of the window glass when in its open position. Given that the window glass is made of toughened glass, the opening mechanism may, if the bonding is relatively secure, exert a relatively high bending moment on the window glass, which gives a particularly stable construction.

The orientable glazing according to the invention also has the favourable effect that, even in the open position, it is remarkably well sealed against the ingress of rain and airborne dust, because the front edge in the direction of travel, the upper edge and the upper part of the rear edge, in the direction of travel, of the window glass are connected to the vehicle bodywork from one end to the other in a sealed manner.

The length over which the run of adhesive extends along the vertical rear edge of the window glass is advantageously determined on a case by case basis as a function of the geometry of the window and of the configuration of the run of adhesive. In general, the length of this segment may be of the order of from 10 to 40%, especially 15 to 30%, particularly 15 to 25%, of the total length of this vertical rear edge. When using a commonplace bonding system, for example a bonding system based on a system of polyurethane with a component which cures under the effect of moisture, the length of this segment of the run of adhesive may be from about a quarter to a third of the total length of this vertical rear edge of the window glass.

According to another advantageous aspect of the invention, the profiled elastomer seal laid along the edge of the window glass has two sealing lips substantially parallel to one another, namely a long lip extending over the space that separates the periphery of the window glass from the window frame, and a short lip resting against the window frame in the region of the angle between the window frame and the attachment flange. Whereas the long outer sealing lip constitutes sufficient protection against normal splashes of water in rainy weather, the short inner sealing lip presses against the window frame with a bending stress which is higher because of its smaller size and increases the sealing effect to the extent that a good seal is also ensured under high loading, as is inevitable, for example, during cleaning with a high-pressure water jet.

Advantageous aspects of the invention will emerge from the dependent claims and from the description below of one preferred embodiment of the invention given with reference to the appended drawing.

DETAILED DESCRIPTION OF THE DRAWINGS

Figure 1:
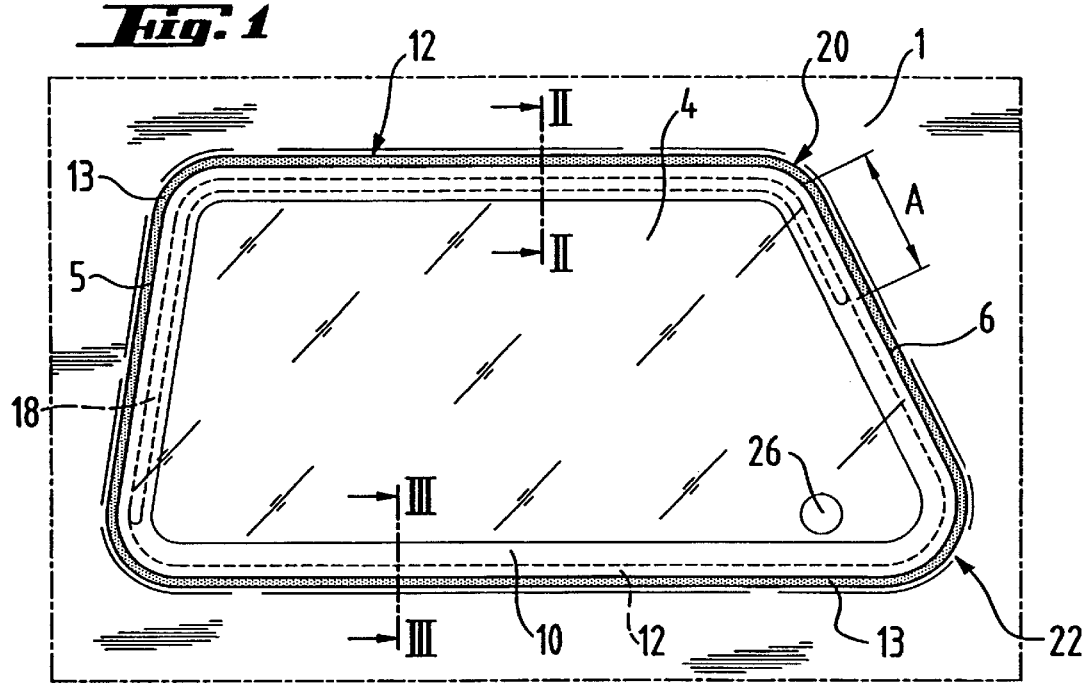
FIG. 1 is an external view of orientable glazing mounted in the window frame of a motor vehicle by bonding.
Figure 2:
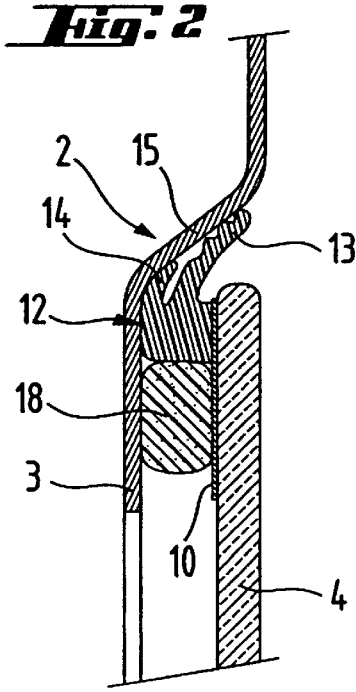
FIG. 2 is a section on II—II of FIG. 1.

The glazing depicted is an orientable rear car glazing. In the sheet metal of the bodywork 1 there is the window frame (that defines an aperture) 2 which has an attachment flange 3 for the window glass 4. The edge 5 of the window glass 4 is the front edge, located facing the front of the car, while the edge 6 is rear edge of the window glass, located facing the rear of the car. The window glass 4 is made of thermally toughened glass and is equipped along the entire edge of its perimeter, with a decorative surround 10 made of opaque enamel which has been applied by serigraphy and baked on during the heating needed to toughen the window glass.

The window glass 4 comprises a peripheral sealing surround 12 made of elastomer laid along the entire periphery of the window glass 4 and which has preferably been moulded directly onto the window glass 4. This sealing surround 12 may be moulded onto the window glass 4 using the injection-moulding technique or the extrusion technique, the surface of the glass or the surface of the decorative surround 10 possibly being treated beforehand by applying an appropriate adhesion promoter so that a good quality durable bond between the sealing surround 12 and the window glass or decorative surround 10 is guaranteed. Among the elastomers that are suitable for the sealing surround 12 are, in particular, PVC, polyurethane systems or thermoplastic elastomers based on polyolefin such as isotactic polypropylene and/or ethylene-propylene-diene rubber. The forming of sealing surrounds of this kind using these materials is part of the state of the art.

The sealing surround 12 has two radially projecting sealing lips, namely a long sealing lip 13 which is closer to the surface of the glass, and a short sealing lip 14 which extends parallel to the first one.

In a particular embodiment, the long lip 13 is at least about twice as long as the short lip 14.

When the window glass is mounted, the long sealing lip 13 is pressed along the window frame 2, and extends over the space between the peripheral edge of the window glass 4 and the wall 15 facing it. The short lip 14 which, because of its shorter length, is less flexible, bears against the base of the window frame with a correspondingly greater force and provides a good seal even under high water pressure.

Laid beside the sealing surround 12 directly on part of the periphery of the window glass is a run of adhesive 18 by means of which the window glass 4 is bonded to the attachment flange 3 in these peripheral regions.

Alternatively, the run of adhesive could be deposited on an appropriate surface of the sealing surround.

The thickness of this run of adhesive 18 will be chosen as a function of the rubbery elastic properties of the material forming the adhesive so that the necessary torsional and stretching stresses in the run of adhesive lead only to elastic deformation. As far as the material of which the adhesive is formed is concerned, materials based on polyurethane systems curing in moisture which are commonly used for mounting windows in automotive vehicle bodywork are already proven. The thickness of the run of adhesive 18 should preferably not be less than 5 mm and will preferably be 6 to 8 mm.

Along the front edge 5 of the window glass, the run of adhesive 18 extends practically over the entire height of the window glass 4 and ends near the lower edge of the window glass. Above, the run of adhesive 18 extends uninterrupted along the entire upper edge of the window glass as far as beyond the upper rear corner 20 of the window glass 4 and along the upper segment A of the rear edge 6 of the window glass. The segment A represents about 15 to 30% of the total length of this edge of the window glass, namely about 60 to 100 mm.

Figure 3:
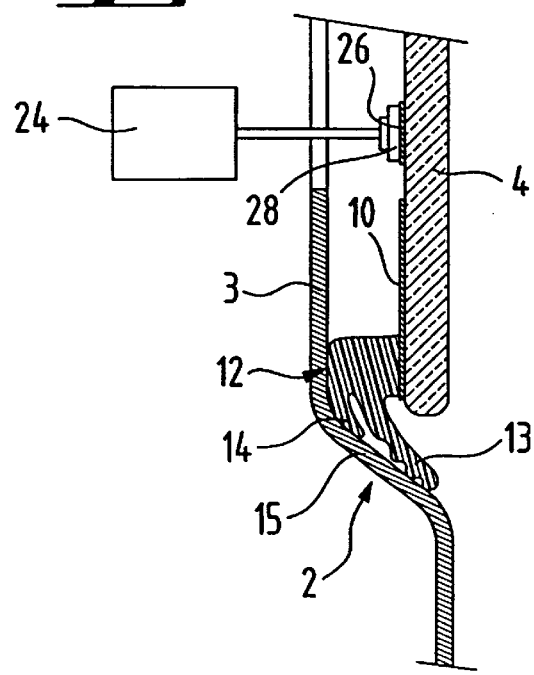
FIG. 3 is a section on III—III of FIG. 1.

An opening and closing mechanism 24 of known and conventional type depicted diagrammatically in FIG. 3 acts on the window glass 4 at the lower rear corner 22 so as to cause the window glass to elastically bend about an axis which is angled with respect to the upper edge. At this point, the window glass 4 may have a hole intended for coupling this device to the window glass. As an alternative, the window glass 4 may, however, also be equipped at this point with a flat deposit 26 of enamel to which the coupling element 28 of the closing mechanism is fixed by bonded assembly.

What is claimed is:

1. An orientable glazing for motor vehicles having a glazing frame (2) which has an attachment flange (3), said glazing comprising a toughened window glass (4), a run of elastically deformable adhesive (18) along part of the periphery of the window glass (4) for bonding the window glass to the attachment flange (3), a profiled elastomer seal (12) laid against the window glass at least in that part of the periphery of the window glass (4) that is not covered by the run of adhesive (18), and an opening and closing mechanism (24) acting at a point near that part of the periphery of the window glass that is not covered by the run of adhesive, wherein the part of the periphery of the window glass including the run of adhesive (18) is along a front edge (5), along an upper edge, along a contour of an upper rear corner (20) of the window glass (4), and along an upper segment (A) of a rear edge (6) of the window glass (4), and wherein the opening and closing mechanism (24) is situated to act in the region of a lower rear corner (22) of the window glass (4) so as to cause the window glass to elastically bend about an axis which is angled with respect to the upper edge.

2. The orientable glazing according to claim 1, characterized in that the run of adhesive, on the upper segment (A) of the rear edge (6) of the window glass (4) represents 10 to 40% of a length of the rear edge (6) of the window glass (4).

3. The orientable glazing according to claim 2, wherein the run of adhesive on the upper segment (A) of the rear edge (6) of the window glass (4) represents 15 to 25% of the length of the rear edge (6) of the window glass (4).

4. The orientable glazing according to either claim 1 or 2, characterized in that the profiled seal (12) is laid against the entire periphery of the window glass (4).

5. The orientable glazing according to either claim 1 or 2, characterized in that the profiled seal (12) is laid directly onto the window glass (4) and in that the run of adhesive (18) is laid parallel to and beside the profiled seal (12).

6. The orientable glazing according to either claim 1 or 2, characterized in that the profiled seal (12) is made of a material selected from the group consisting of a polyolefin thermoplastic elastomer, polyvinyl chloride, a polyurethane system, or a combination thereof.

7. The orientable glazing according to either claim 1 or 2, characterized in that the profiled seal (12) has two sealing lips (13, 14) arranged parallel to one another, wherein the sealing lip (13) closest to the surface of the glass is longer than, the other sealing lip (14).

8. The orientable glazing according to claim 7, wherein the sealing lip closest to the surface of the glass is at least almost twice as long as the other sealing lip.

* * * * *

UNITED STATES PATENT AND TRADEMARK OFFICE
CERTIFICATE OF CORRECTION

PATENT NO. : 6,240,676 B1
DATED : June 5, 2001
INVENTOR(S) : G. Cornils et al.

Page 1 of 1

It is certified that error appears in the above-identified patent and that said Letters Patent is hereby corrected as shown below:

<u>Column 4,</u>
Line 26 (claim 1, line 14), replace "comer" with -- corner --.
Line 34 (claim 2, line 2), after "adhesive", delete -- , --.
Line 57 (claim 7, line 5), after "than", delete -- , --.

Signed and Sealed this

Thirtieth Day of October, 2001

Attest:

NICHOLAS P. GODICI
*Attesting Officer*     *Acting Director of the United States Patent and Trademark Office*